United States Patent [19]

Szabrak et al.

[11] 3,757,672

[45] Sept. 11, 1973

[54] DEEP FAT FRYER FEEDING APPARATUS

[75] Inventors: Robert H. Szabrak; Warren Stubblebine, both of Sandusky, Ohio

[73] Assignee: Sam Stein Associates, Inc., Sandusky, Ohio

[22] Filed: Feb. 8, 1971

[21] Appl. No.: 113,395

[52] U.S. Cl.......................... 99/404, 99/337, 99/408
[51] Int. Cl. ............................................. A47j 37/12
[58] Field of Search ................. 99/1, 404, 407, 405, 99/406, 408, 443 C, 337

[56] References Cited
UNITED STATES PATENTS

| | | | |
|---|---|---|---|
| 3,309,981 | 3/1967 | Benson et al. ..................... | 99/407 X |
| 3,376,806 | 4/1968 | Magnusson ........................... | 99/408 |
| 3,635,149 | 1/1972 | Smith et al............................ | 99/404 |
| 2,833,203 | 5/1958 | Benson et al. ....................... | 99/404 |
| 2,546,163 | 3/1951 | McBeth ................................ | 99/404 |
| 1,760,979 | 6/1930 | Ferry .................................... | 99/405 |
| 3,329,081 | 7/1967 | Roth .................................... | 99/407 X |

*Primary Examiner*—Billy J. Wilhite
*Attorney*—Baldwin, Egan, Walling & Fetzer

[57] ABSTRACT

A deep fat fryer includes an elongated housing holding a bath of hot fat through which an endless main conveyor carries a batter coated food product through the bath from the infeed end thereof to a discharge end thereof. Above the main conveyor is a submerger conveyor having a run moving from the infeed end to the discharge end of the housing and adapted in operative position to lie close to the food portions on the main conveyor and to hold them submerged in the hot fat. At the infeed end of the main conveyor, there is provided a tiltable infeed conveyor, the end of which upon which the product is originally placed being movable from a position near the top level of the bath of hot fat or to another position submerged in the hot fat at approximately the horizontal level of the main conveyor so that the operator may select the time of exposure of the product to the cooking action of the hot fat before the product strikes any conveyor, between zero and that time sufficient to form a thin crust on the outside of the batter coating. To provide more economical operation by limiting the total volume of hot fat in the bath, the bottom of the housing at the infeed end of the apparatus is brought up to a level closely below the lowermost position of the infeed conveyor. In operative position of the apparatus, the submerger conveyor nests into the side rails of the main conveyor and an elongated hood encloses the hot bath housing at a zone closely above the submerger conveyor from one end of the housing to the other. For cleaning and maintenance, power means is provided to lift the hood and the submerger conveyor and the main conveyor out of the hot bath and to move them to separated horizontal levels so as to provide access space between the hood and the submerger conveyor, and between the two conveyors, and between the main conveyor and the housing holding the hot bath. The power means can then be reversed to place all of the parts in operative position.

20 Claims, 19 Drawing Figures

INVENTORS
ROBERT H. SZABRAK
WARREN STUBBLEBINE
BY
Baldwin, Egan, Walling & Fetzer
ATTORNEYS Patented Sept. 11, 1973

INVENTORS
ROBERT H. SZABRAK
WARREN STUBBLEBINE
BY
Baldwin, Egan, Walling & Fetzer
ATTORNEYS

INVENTORS
ROBERT H. SZABRAK
WARREN STUBBLEBINE
BY
Baldwin, Egan, Walling &Fetzer
ATTORNEYS

INVENTORS
ROBERT H. SZABRAK
WARREN STUBBLEBINE
BY
Baldwin, Egan, Walling & Fetzer
ATTORNEYS

DEEP FAT FRYER FEEDING APPARATUS

An object of the present invention is to provide an elongated deep fat fryer which is easy and economical to operate and to maintain. To this end, a main conveyor of the endless type is provided for carrying the food products through the hot fat with an infeed conveyor at one end thereof and a submerger conveyor having a run adapted to lie close to the food on the main conveyor so as to hold it submerged during passage through the hot fat. These conveyors are nested into each other and into the housing which holds the hot fat beneath an elongated hood which encloses all of that apparatus. Near the four end corners of the apparatus, four jacks are provided operating vertically to lift the hood which carries with it the submerger conveyor and the main and infeed conveyors arranged in such a manner that they are separated from each other in different horizontal levels and well above the hot bath for inspection, cleaning and maintenance. The jacks may then be reversed to place all of the parts in an operative position.

Another object of the invention is to provide an apparatus for deep fat frying a batter coated food product which involves the novel step of varying the time of exposure of the product to the cooking action of the fat before the product strikes a conveyor. This is provided through a tilting action of an infeed conveyor at one end of the main conveyor and makes it possible to cook a thin crust on the batter coating, if desired, before the product hits the main conveyor, whereby the coating is cooked without being disturbed and gives a better looking product.

Another object of the invention is to reduce the amount of hot fat in the housing by lifting the bottom of the hot fat reservoir up to a level closely below the infeed conveyor in its lowermost position and this greatly reduces the volume of the hot oil or fat which deteriorates and at times has to be thrown away.

Other objects and advantages of the present invention will be apparent from the accompanying drawings and description and the essential features thereof will be set forth in the appended claims.

In the drawings,

FIG. 17 is a perspective view taken at the infeed end of the apparatus with parts broken away and with the cover hood removed and with the top submerger conveyor belt removed to more clearly show the construction; while

Figure 1:
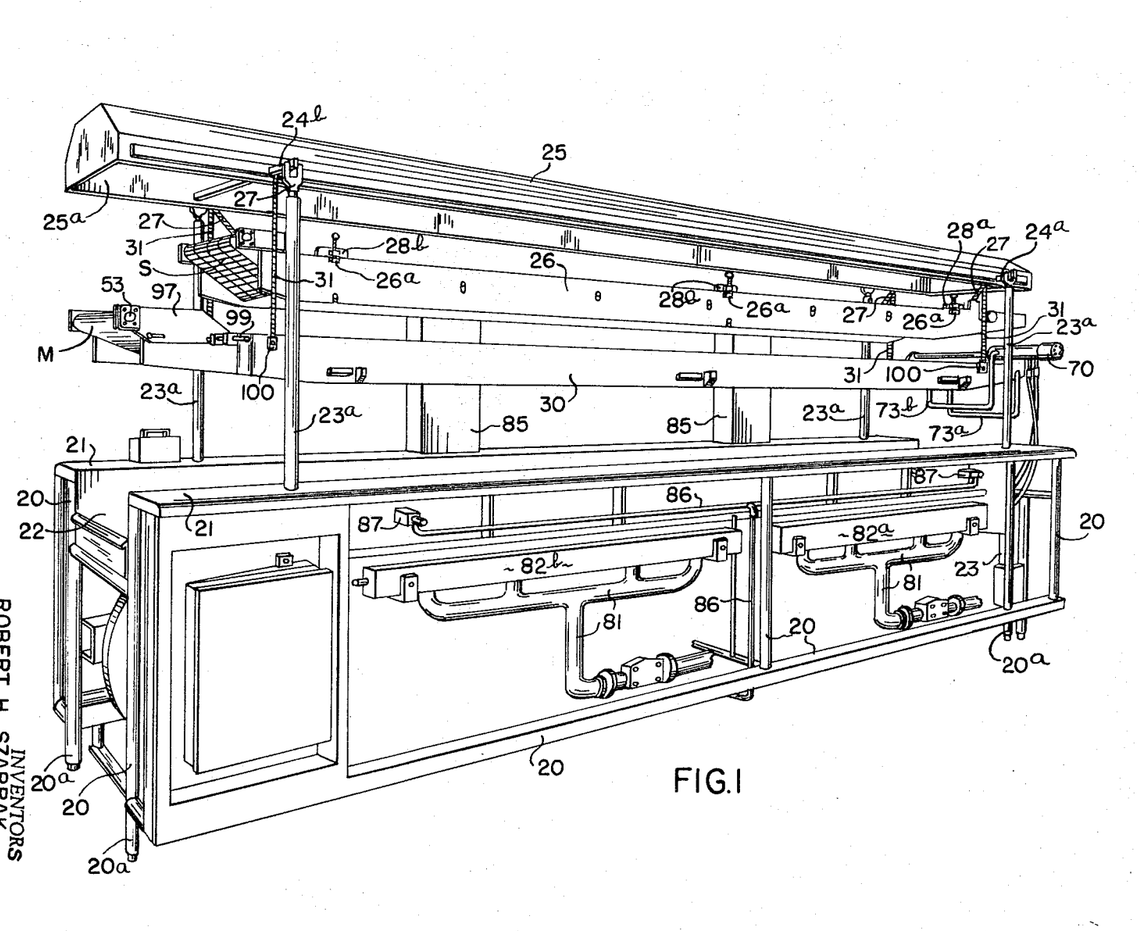
FIG. 1 is a perspective view of the apparatus of this invention looking at the rear of the apparatus from the discharge end thereof.
Figure 2:
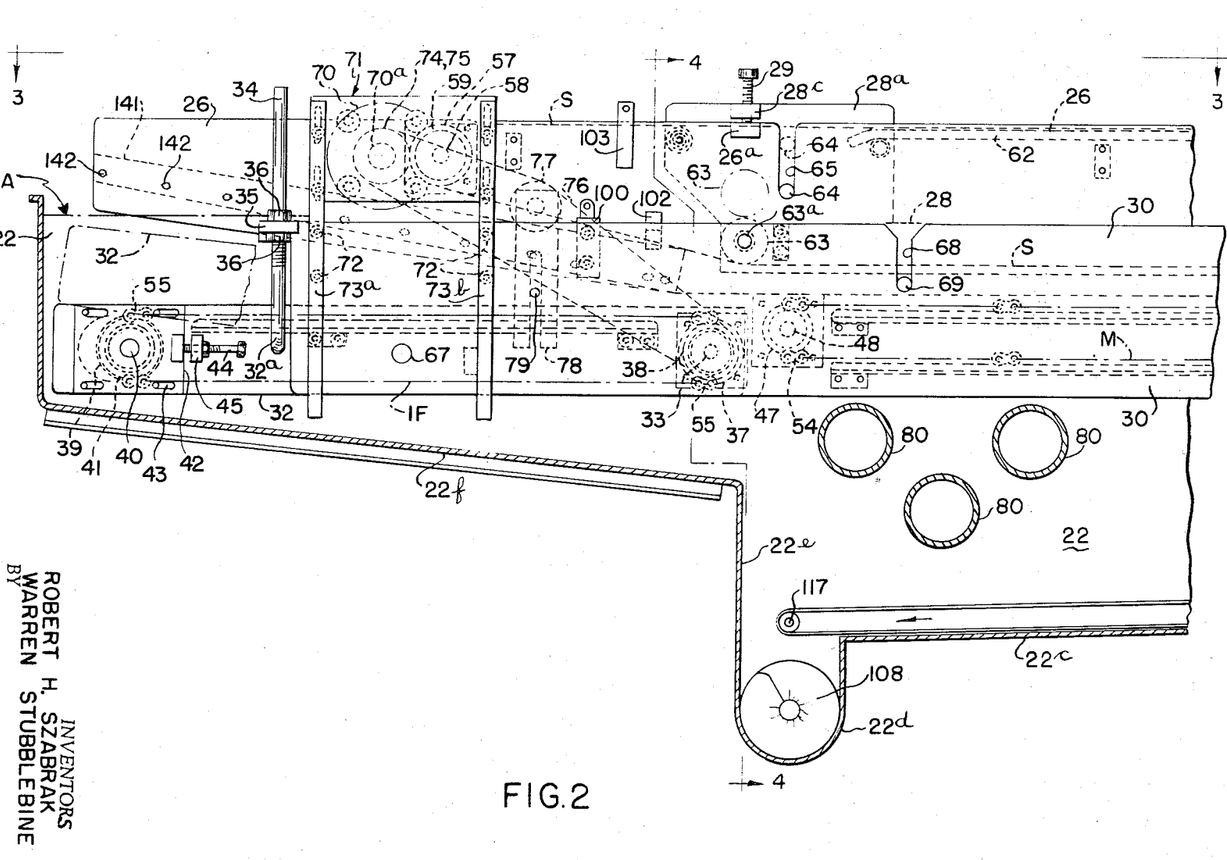
FIG. 2 is a fragmental sectional view near the infeed end of the apparatus of FIG. 1 and taken along the line 2—2 of FIG. 3.
Figures 5, 6:
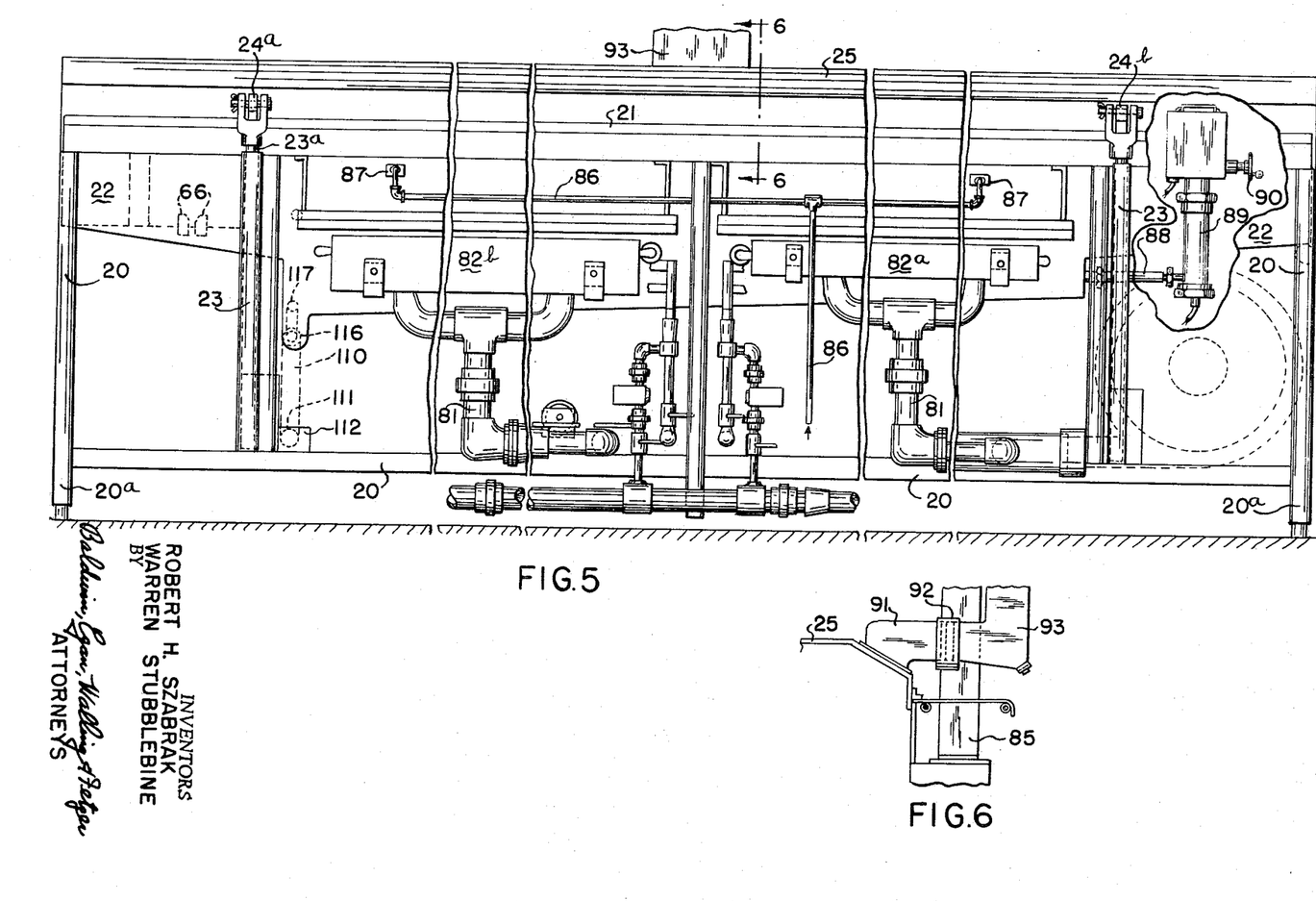
FIG. 5 is a side elevational view of the apparatus of FIG. 1 on a larger scale and taken from the side opposite FIG. 1.
FIG. 6 is a fragmental sectional view on a reduced scale taken along the line 6—6 of FIG. 5.
Figure 7A:
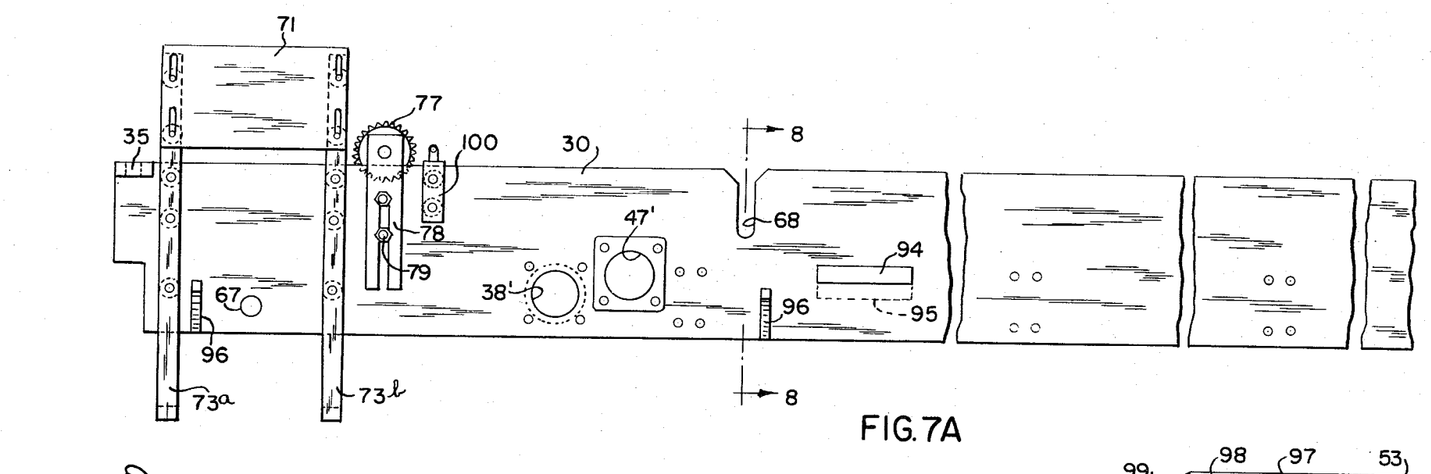
FIGS. 7A and 7B are side elevational views of a side rail of the main conveyor with the infeed end thereof toward the left as viewed in the drawing.
Figures 7B, 8:
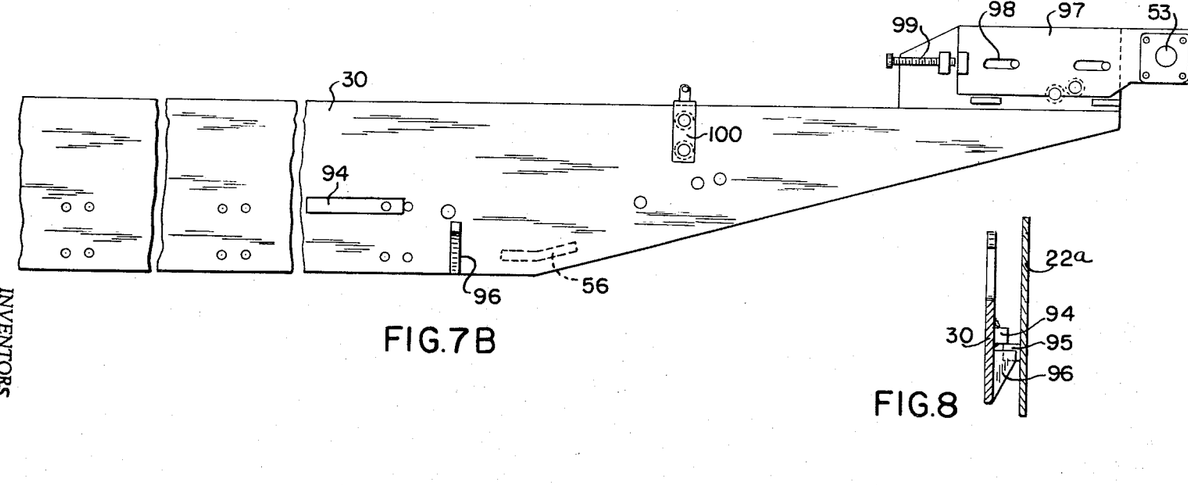
FIG. 8 is a sectional view taken along the line 8—8 of FIG. 7A.
Figure 9:
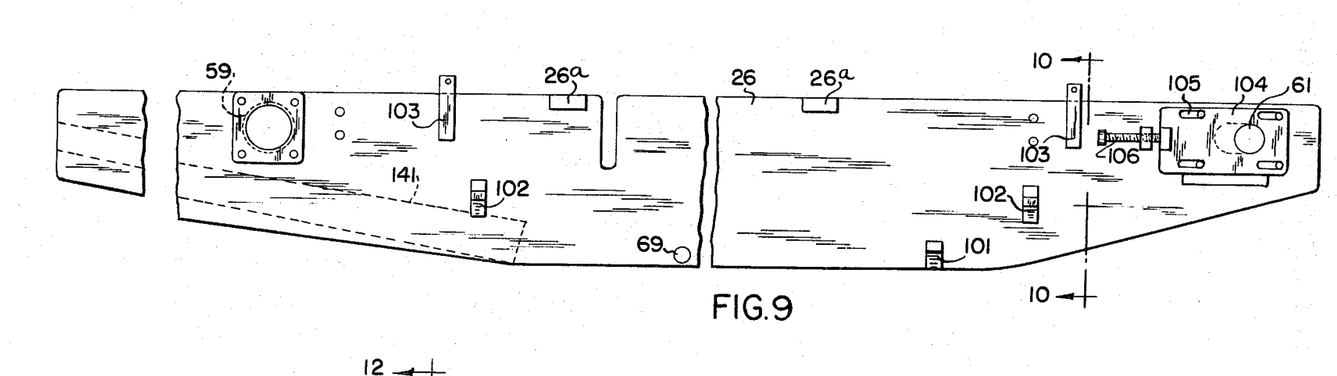
FIG. 9 is a side elevational view of an outer side rail of the submerger conveyor, the infeed end thereof being toward the left.
Figures 10, 11:
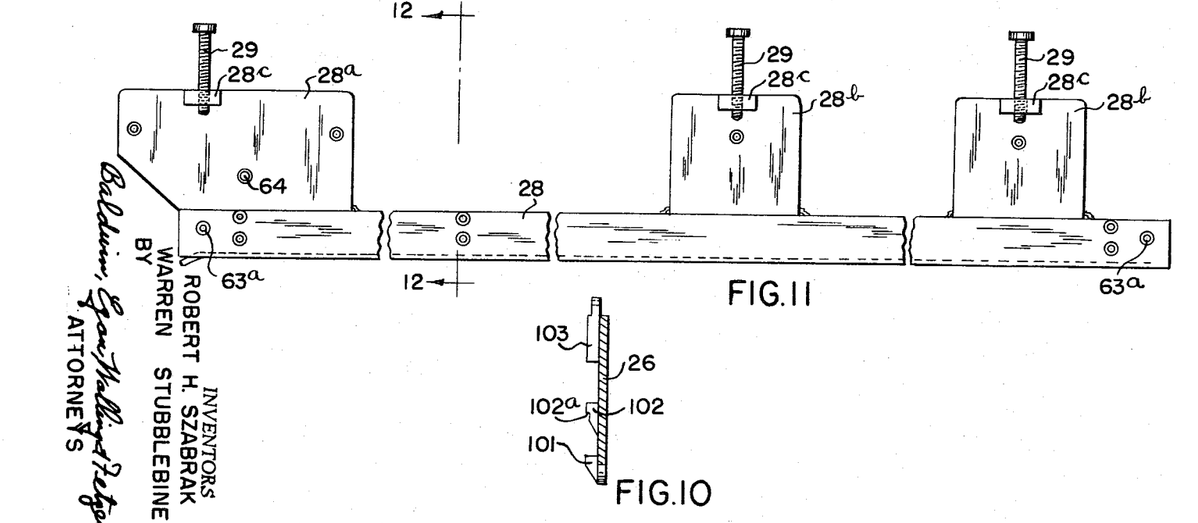
FIG. 10 is a sectional view taken along the line 10—10 of FIG. 9.
FIG. 11 is a side elevational view of an inner side rail of the submerger conveyor with the infeed end toward the left.
Figure 12:
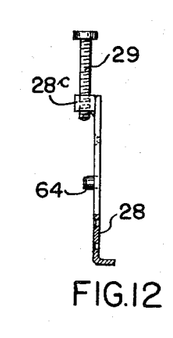
FIG. 12 is a sectional view taken along the line 12—12 of FIG. 11.

The apparatus as shown generally in FIG. 1 comprises a rigid unitary frame 20 which extends from end to end of the apparatus and up to the level of apron members 21 which are directly secured to the top of the frame 20 and are connected in a unitary manner with a lining which forms an elongated horizontal reservoir 22 which extends from end to end of the apparatus for the purpose of holding a bath of hot fat or oil. The frame has feet 20a which rest upon the floor. Mounted near the four corners of the apparatus are four vertically oriented hydraulic jacks 23, not shown in FIG. 1, which have vertically extending piston rods 23a which are connected at upper end to a cross bar 24a near the infeed end of the apparatus and to a cross bar 24b near the discharge end thereof. Mounted above these cross bars is an elongated hood or cover 25 which has a planar rectangular opening 25a at its lower side which makes a close fit with the aprons 21 when the apparatus is in its nested and closed position for operation. Two parallel outer side rails 26 of the submerger conveyor are suspended by shorter flexible chains 27 at one end connected to cross bar 24a and at the other end connected to cross bar 24b. One of these cross rails is shown in FIG. 9. Hardly visible in FIG. 1, but better understood from FIGS. 2 and 11, are a pair of parallel inner side rails for the submerger conveyor which have vertically upstanding projections. The inner side rails 28 of the submerger conveyor have vertically upstanding projections 28a and 28b which provide relatively vertical adjustment between the outer side rails 26 and the inner side rails 28 by means of adjustment screws 29 which are threaded through lugs 28c rigid with the projections 28a and 28b and which have their lower ends abutting against lugs 26a rigid with side rails 26. A pair of parallel side rails 30 for the main conveyor are suspended on longer flexible chains 31, two connected with cross bar 24a near the infeed end and two connected with cross bar 24b near the discharge end of the apparatus. A detail of the rail 30 is shown in FIGS. 7A and 7B. The nested and operative position of the parts is shown in FIG. 5 while the open or inoperative position of the parts is shown in FIG. 1 with the side rails 30 of the main conveyor well above the hot bath in the housing 22, and with side rails 26 of the submerger conveyor spaced vertically over the main conveyor, and finally with the hood 25 raised above the submerger conveyor rails 26. In this open position of the parts, inspection, cleaning and maintenance is greatly facilitated.

Figure 3:
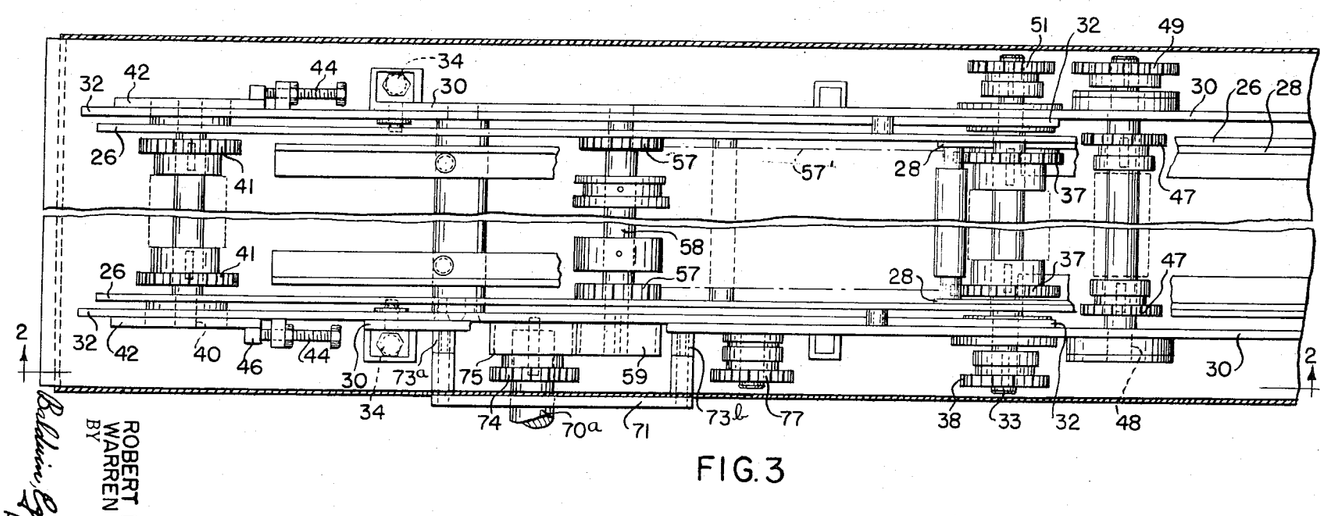
FIG. 3 is a fragmental top plan view taken along the line 3—3 of FIG. 2 with conveyor belts and drive chains omitted for clarity.
Figure 17:
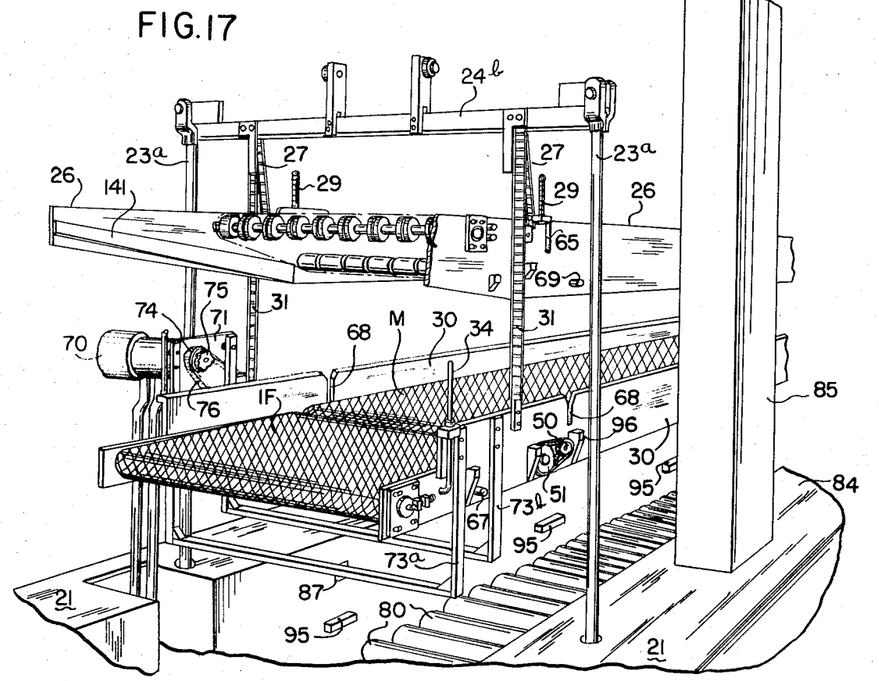

An infeed conveyor is provided ahead of the main conveyor as best seen in FIGS. 2, 3 and 17. A pair of parallel side rails 32 are secured together to form a rigid frame and the side rails are mounted to oscillate about a cylindrical bearing surface concentric with shaft 33 which is rotatably mounted in the main conveyor side walls 30. The lowermost position of this infeed conveyor is shown in full lines in FIG. 2 and its approximately upper position in dot-dash lines. With the upper level of the hot fat at A as shown in FIG. 2, or approximately so, batter coated food products may be placed on the infeed conveyor with little or no cooking effect of the hot fat before the product reaches the conveyor belt. However, with the infeed conveyor at its lowermost position, the food product must pass from the upper level of the hot fat down to the level of the infeed conveyor belt and this gives sufficient time to cook a thin crust or shell on batter coating so that the coating is not disarranged by contact with the conveyor belt. The angular position of the infeed conveyor about the center 33 is controlled by two L-shaped adjustment rods 34, each of which has a short end which passes through a suitable opening at 32a in one of the side rails, and each having a vertical leg passing upwardly through an ear 35 rigidly secured to the main conveyor side rail 30. The rod 34 is threaded where it passes through the ear 35 and lock nuts 36 hold rod 34 in any desired selected position.

Figures 13, 14:
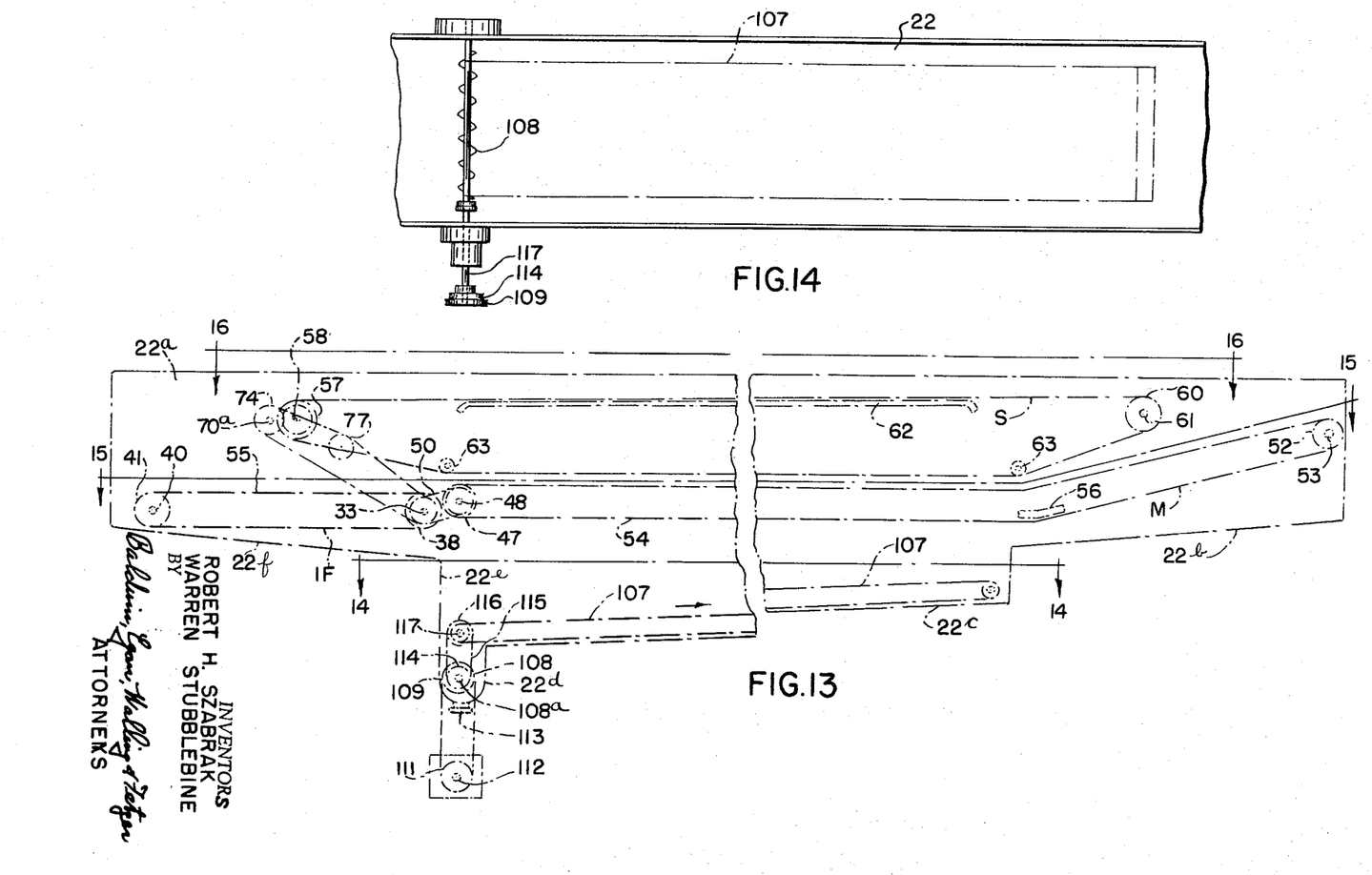
FIG. 13 is a diagrammatic view of the conveyors taken from side elevation with the infeed end toward the left.
FIG. 14 is a diagrammatic view of a sediment conveyor taken along the line 14-14 of FIG. 13.
Figure 15:
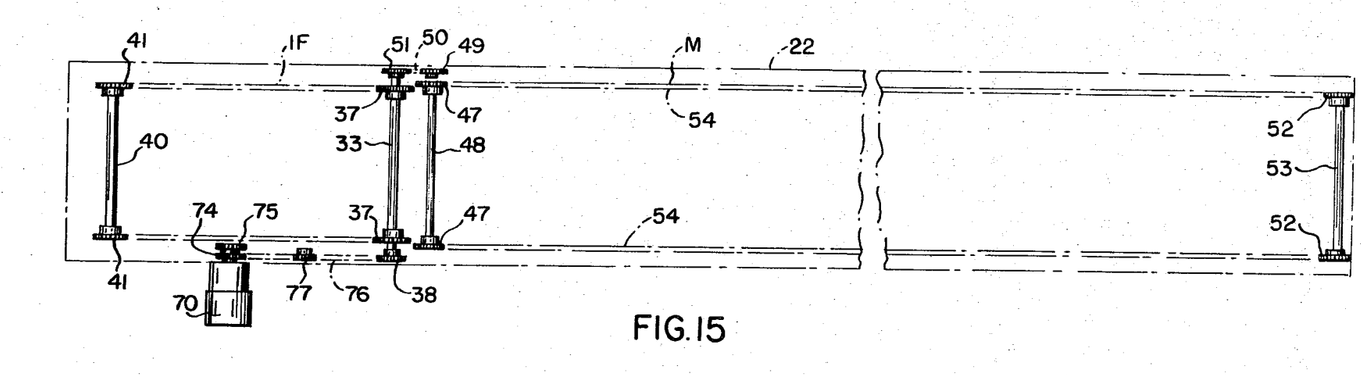
FIG. 15 is a diagrammatic plan view of the main and infeed conveyors taken along the line 15—15 of FIG. 13.
Figure 16:
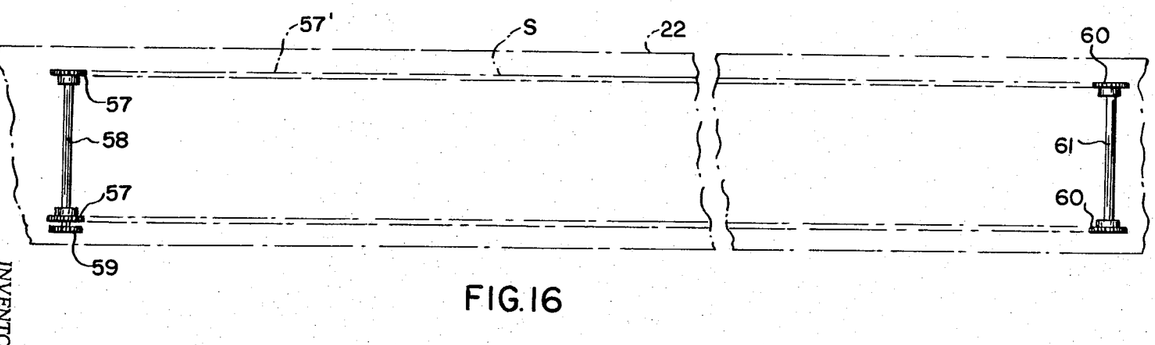
FIG. 16 is a diagrammatic plan view of the top submerger conveyor taken along the line 16—16 of FIG. 13.

The general arrangement of the conveyor belts will be readily understood from FIGS. 13, 14, 15 and 16. It should be understood that the conveyor side rails, mentioned above, such as the pairs 26, 28 and 30, are in each case connected together by cross strut members in the usual manner to make each one a rigid frame. The infeed conveyor belt IF, the main conveyor belt M and the submerger belt S are all endless and of any desired belt structure, in most cases an open mesh wire belt being preferred. The infeed conveyor passes over a pair of drive sprockets 37 which are rotatable with shaft 33 which is journaled in the side rails 30. This shaft is driven by a chain sprocket 38. The belt IF at its other end passes over a belt idler sprocket 39 which is rotatable with a shaft 40 which carries a pair of chain sprockets 41 which are journaled in the side rails 32 by means of a slidable plate 42 which has pin and slot connections 43 with the side rail for endwise adjustment relative to the side rails. This adjustment comprises a screw 44 threaded into a lug 45 fastened to the side rail 32, the screw bearing against a lug 46 which is welded to plate 42. The main conveyor M passes over a pair of drive pulleys 57 near the infeed conveyor, these pulleys being driven by a shaft 48 which is journaled in the side rails 30 and is driven by a chain sprocket 49 which is connected by a drive chain 50 with a drive sprocket 51 which is driven from shaft 33. At its opposite end, the main conveyor belt passes over idler belt sprockets 52 which are journaled in the side rails 30 and are rotatable with a cross shaft 53. It will be noted that the belt sprockets 47 at one end of the main conveyor and the sprockets 52 at the opposite end are connected by drive chains 54 to keep them in exact timing. Likewise, the belt sprockets 39 at one end of the infeed conveyor and the sprockets 37 at the other end are connected by drive chains 55 for the same purpose. Angular belt guides 56 are provided where the main conveyor lower run turns upwardly toward the discharge end of the apparatus as seen in FIG. 13. Two of these guides are provided, one secured to the inner face of each of the side rails 30.

The submerger conveyor belt S, at its left-hand end as seen in FIG. 13 passes over a pair of belt drive sprockets 57 which are driven from shaft 58 which in turn is driven by a drive gear 59. At its opposite end, this belt passes over a pair of belt sprockets 60 connected by idler shaft 61. Both shafts 58 and 61 are journaled in the side rails 26. The upper run of this belt is supported on a plurality of parallel support rods 62 which in turn are carried by side rails 26. The lower run of this conveyor belt has its level controlled by rollers 63 which are freely rotatable about centers 63a indicated on FIG. 11. It has previously been mentioned that the inner submerger belt side rails 28 are adjustable vertically relative to the outer side rails 28 by manipulation of the screws 29. The inner and outer guide rails are held in vertical alignment during such adjustment by means of two outwardly extending pins 64 on guide rail portions 28a which slide in vertical slots 65 in side rails 26. Referring to FIG. 2, the lowermost position of rollers 63 and pins 64 is indicated respectively in dotted and full lines. The uppermost position of the roll 63 is indicated in dot-dash lines as is the upper position of pins 64.

Means is provided to hold all of the conveyors in the same relative movement longitudinally of the apparatus while permitting endwise expansion due to the effect of the heat of the hot fat in the reservoir 22. As best seen in FIG. 5, near the infeed end of the apparatus a pair of guides 66 are secured to the inner face of the parallel walls of the reservoir 22 in position to receive a pair of outwardly extending pns 67, one rigidly secured to each of the main conveyor side rails 30. As best seen in FIG. 2, vertically extending, upwardly opening slots 68 are provided in the side rails 30 of the main conveyor opposite each other in position to receive laterally outwardly extending pins 69 on the outer side rails 26 of the submerger conveyor. The guides 66 and the slots 68 are tapered inwardly at their upper ends so as to guide the pins 67 and 69 respectively into proper position as the conveyors move from open position into nested position.

The main conveyor and the infeed conveyor and the submerger conveyor are all driven from a motor 70 which in this case is hydraulically driven, although any suitable drive might be used. This motor is mounted on a mounting board 71 which is rigidly connected with the main conveyor side rails 30 by fastenings 72 which pass through U-shape support brackets 73a and 73b which pass beneath the conveyor and turn upwardly on the far side as viewed in FIG. 2 to be there rigidly secured to the other side rail 30. The motor has a driven shaft 70a which drives concentric chain drive sprocket 74 and spur gear 75. Sprocket 74 is connected by endless chain 76 with chain drive sprocket 38, previously mentioned. This chain passes over an idler sprocket 77 which is mounted on conveyor side rail 30 by a vertically adjustable bracket 78 secured by a pin and slot connection 79. Sprocket 38 drives shaft 33 which on the far side of the machine drives sprocket 51 which is connected by chain 50 to sprocket 49 as previously mentioned. This is clearly seen in FIG. 15. Spur gear 75 meshes with gear 59 which as previously mentioned is journaled in side rail 26 of the submerger conveyor. These gears 75 and 59 are out of mesh when the parts are in the position of FIG. 1 but automatically come into mesh when the parts move into the position of FIG. 5.

Figure 4:
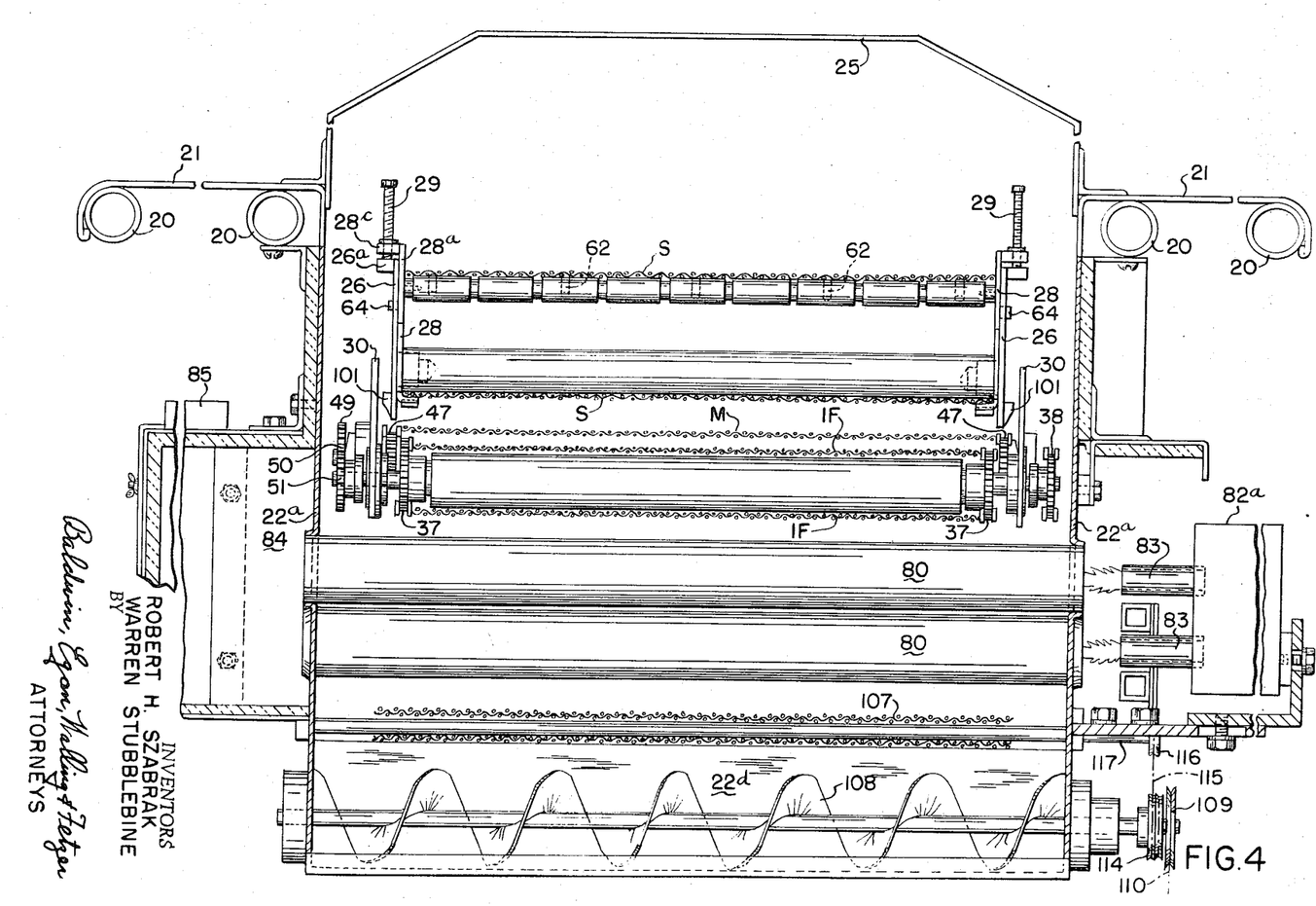
FIG. 4 is a sectional view taken along the line 4—4 of FIG. 2.

The hot fat in the reservoir 22 is maintained at the proper temperature by a plurality of parallel tubes 80 which run from side to side of the reservoir and are welded in position as clearly shown in FIG. 4 in suitable openings in the side walls 22a of the reservoir. Preferably, these tubes are in a double staggered arrangement toward the infeed end of the apparatus as seen in FIG. 2. It is usually sufficient to utilize a single row for approximately one-half of the length of the reservoir near the discharge end of the apparatus. A combustible gas is brought through distribution lines 81 to manifolds 82a and 82b. The manifold 82a is shown toward the right-hand side of FIG. 4 and is provided with a plurality of jet tubes 83, each one of which is opposite an open end of one of the tubes 80. At the entrance end of the tubes 80, the gas mixes with air which burns throughout the length of the tube and the products of combustion are discharged into a manifold 84 at the opposite side of the apparatus. Two stack pipes 85 extend upwardly from the manifold 84 to carry the products of combustion to a suitable location. All heated portions of the apparatus are supplied with heat insulation in the usual manner.

Preferably, for safety against fire, frozen carbon dioxide is provided in lines 86 and expanded and led through one of the side walls of the reservoir 22 through expansion horns 87.

Means not completely shown are provided to maintain the proper level of hot fat in the reservoir 22. In FIG. 5, there is shown toward the discharge end of the apparatus a pipe 88 communicating from the hot fat reservoir 22 and an oil float chamber 89 in which two floats are provided. An upper float rises and falls according to the top level of hot fat or oil in the reservoir 22 and starts a supply pump to add additional fat or oil when necessary to maintain a desired top level. A lower float indicates a dangerous low level of oil and shut down the apparatus. Means is shown at 90 for controlling the position of the upper float in chamber 89 which controls the desired uppermost level A of the oil in the reservoir 22.

The hood 25, as seen in FIG. 6, has a vent connection 91 for leading away fumes from the upper portion of reservoir 22. This vent has a quickly assembled connection 92 with a stationary vent stack 93 so that the vent can normally be connected as shown in FIG. 6 for ordinary operation of the apparatus and the connection 92 may be quickly broken if the apparatus is to be moved to the expanded position of FIG. 1.

Parts are provided to properly position the conveyor side rails as they move from the position of FIG. 1 to that of FIG. 5. Referring to FIGS. 7A and 7B, the conveyor side rails 30 are provided with outwardly extending position stops 94 which engage against stops 95 on the inner surface of the reservoir walls 22a as shown in FIG. 8 when the conveyor reaches its fully nested position ready for operation. Also, suitable wedge shape guides 96 are provided extending laterally outwardly on the side rails 30 to center the main conveyor side rails relative to the reservoir walls 22a when the parts are nested together. As seen toward the right-hand end of FIG. 7B, the parts associated with idler shaft 53 are mounted in a plate 97 which has pin and slot connections 98 with the side rail 30 and is adjustable in a horizontal direction by the screw 99 to properly tension the main conveyor belt M. At the proper position near each end and on each side, the side rails 30 are provided with fastenings 100 to hold the flexible chains 31.

Referring to FIG. 9, the outer submerger side rails 26 have suitable positioning wedges 101 extending outwardly therefrom, as clearly seen in FIG. 10 for centering the side rails 26 as they nest into the side rails 30 of the main conveyor in fully nested and operative position. Other combined wedges and stops 102 are provided having shoulders 102a which rest on top of the conveyor side rails 30 in fully nested position so as to insure that the parts are properly oriented. Near each end and on each side the conveyor side rails 26 are provided with fastening devices 103 to which flexible chains 27 are fastened. Toward the discharge end of each side rail 26 means is provided for mounting the parts associated with the idler shaft 61. This comprises a plate on each side rail 104 having pin and slot connections 105 with the side rail and means for horizontal adjustment as shown at screw 106 so as to control the tension of submerger belt S.

As best seen in FIGS. 2 and 13, the bottom of the reservoir 22 has a portion 22b at the discharge end sloping downwardly to approximately the position of the guide members 56 where the main conveyor M turns upwardly, then the bottom drops down to another slightly inclined portion 22c which continues downwardly to a sediment trough 22d, after which it turns upwardly at 22e and then is inclined along the entire length of the infeed conveyor IF for a portion 22f which extends to the infeed end of the apparatus. For the handling of sediment which may collect on the bottom portion 22c, there may be supplied a sediment conveyor 107 which has a lower run adapted to substantially scrape along the inner surface of the bottom portion 22c traveling in the direction of the arrows to carry sediment into the sediment trough 22d. There a screw conveyor 108 extends transversely across the entire width of the deep fat reservoir 22 and journaled in the side walls 22a by its shaft 108a. This shaft is rotated by a pulley 109 which is connected by belt 110 to a pulley 111 driven by a motor 112 either mounted on the frame 20 or on the floor. Conveyor 108 is rotated in a direction to carry the sediment toward one of the side walls 22a of the reservoir and there a closeable outlet 113 is provided for cleaning out the sediment when necessary. The conveyor 107 is driven by another pulley 114 on shaft 108a which in turn is connected by a belt 115 to a drive pulley 116 on shaft 117 which is journaled in the side walls 22a.

Figure 18:
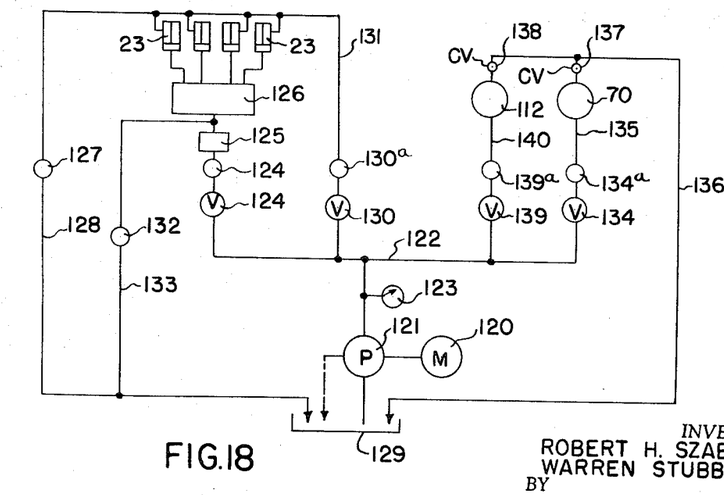
FIG. 18 is a diagrammatic view of the hydraulic system for operating the four hydraulic jacks which move the conveyors into and out of nested operating position.

The hydraulic control system is shown in FIG. 18. Motor 120 drives a pump 121 which supplies high pressure fluid in line 122, the pressure of which is indicated on gauge 123. To operate the jacks 23 in an upward direction so as to move the parts of the apparatus from the position of FIG. 5 to the position of FIG. 1, valve 124 is opened by its solenoid 124a causing the pressure fluid to pass through a check valve 125 and a divider 126 so as to operate all of the four hydraulic jacks in parallel in an upward direction. At the same time, a solenoid is operated at 127a to open the return line 128 for flow of the displaced hydraulic fluid back to the sump 129. To operate the jacks 23 in the opposite direction so as to fully close the apparatus as shown in FIG. 5, valve 130 is opened by its solenoid 130a while at the same time the valve at 127 is closed. This causes the pressure fluid to pass through line 131 to the upper ends of the hydraulic jacks 23 to drive the piston rods thereof downwardly. At the same time, a valve is opened at 132 to permit flow through line 133 back to the sump 129. To operate the conveyors, motor 70 is energized by opening valve 134 by its solenoid 134a to permit flow through lines 135 and 136 thus operating motor 70. At such time, check valve 137 permits flow only toward line 136 and check valve 138 prevents flow backwardly toward the motor 112. To operate motor 112, valve 139 is opened by means of its solenoid 139a permitting flow through line 140, motor 112, check valve 138, and line 136 back to the sump.

Means is provided to prevent the collection of food products on the infeed conveyor IF along the sides close to the side rails 26. This includes an inclined guide member 141 secured along the inner face of each side rail 26 a short distance above the uppermost position of the infeed conveyor and extending from the infeed end thereof to a position very close to the drive sprockets 37. These members 141 are preferably made of Teflon secured to the side rails 126 and 142. In the absence of these guide members 141, the discrete food products tend to jam up toward the edges of the infeed conveyor IF along the inner faces of the side rails 26.

The optimum position of strips 141 is one having the bottom edges of strips 141 from about one-quarter inch to about one inch above the infeed conveyor belt IF. In FIG. 2, the position shown in about right if the infeed conveyor rails 32 are in the dot-dash position, or a little higher. The invention includes suitable means for varying the position of the bottom edges of the strips 141, either by adjusting the strips on side rails 26 or providing wider strips whose bottom edges will extend to a lower level if the infeed conveyor is lowered to the full line position of FIG. 2.

Referring to FIG. 2, the right-hand end of the infeed conveyor is shown as a little below the left-hand end of the main conveyor. In some cases these ends may be at the same level, or the end of the main conveyor may be a little lower than the adjacent end of the infeed conveyor, so long as the food product transfers smoothly from the infeed conveyor to the main conveyor.

What is claimed is:

1. In a deep fat fryer, an elongated housing adapted to hold a bath of hot fat up to a predetermined level and having means for heating said fat, an endless main conveyor mounted on said housing and adapted in operative position to carry product portions on the upper run thereof from an infeed end of said housing to a discharge end thereof including a submerging of said portions in said hot fat, a submerger conveyor mounted on said housing and having a run moving from said infeed end to said discharge end and adapted in operative position to lie close to said portions on said main conveyor and hold them submerged in said hot fat, means for driving said conveyors, power means associated with said housing for lifting said main conveyor to an inoperative position upwardly out of said housing, said power means having connections with said submerger conveyor for lifting said latter conveyor to an inoperative position spaced above said main conveyor in its inoperative position, and said power means having operative connections for returning said main conveyor to operative position in said housing and for moving said submerger conveyor into a position partially nested into said main conveyor.

2. In a deep fat fryer as defined in claim 1, a hood covering said housing from end to end, and said lifting means having connections with said hood for lifting said hood to a position spaced above siad submerger conveyor when the latter is in said inoperative position.

3. A deep fat fryer as defined in claim 2, wherein said lifting means comprises a plurality of vertically movable members seucred to said hood, said means arranged to cause said members to travel vertically simultaneously at the same speed to hold said hood horizontally level, and plural flexible suspension members extending downwardly to said conveyors holding the latter level, said suspension members for said main conveyor being longer than said suspension members for said submerger conveyor.

4. A deep fat fryer as defined in claim 3, wherein said vertically movable members include a plurality of hydraulic jacks having vertically extending piston rods connected to said hood, and a source of hydraulic fluid under pressure connected in parallel to said jacks to raise and lower said piston rods vertically.

5. A deep fat fryer as defined in claim 1, including mutually engaging positioning members on said housing and main conveyor, and other mutually engaging members on said main conveyor, said positioning members insuring proper movement of said conveyors into operative position when so moved from said lifted position.

6. A deep fat fryer as defined in claim 5, wherein some of said positioning members lock said conveyors at one end in a fixed position lengthwise of said housing so that thermal expansion occurs in both said conveyors toward the other end of said housing.

7. A deep fat fryer as defined in claim 1, wherein said submerger conveyor is comprised of a pair of inside side rails and a pair of outside side rails in vertically movable relationship, said submerger conveyor being carried by said inside side rails, said submerger lifting connections being carried by said outside side rails, and means engaged between said inside and outside rails for varying the position of said inside rails relative to said outside rails.

8. A deep fat fryer as defined in claim 1, wherein said housing has a flat bottom extending for a major portion of its length and terminating in a cross recess extending below said bottom forming a sediment trough, a sediment conveyor in said housing having a run scraping said bottom, means causing said last named run to travel toward said recess, a discharge conveyor in said recess at right angles to said sediment conveyor and in position to receive sediment from said last named conveyor run, and means driving material in said discharge conveyor to one side of said housing.

9. A deep fat fryer as defined in claim 1, including an infeed conveyor in said housing upstream from said main conveyor and positioned to discharge product portions on said main conveyor, said housing having a flat bottom extending beneath said main conveyor and terminating at its end toward said infeed conveyor in a recess extending downwardly below said flat bottom and extending substantially entirely across said housing a sediment conveyor in said housing having a run scraping said bottom, means causing said last named run to travel toward said recess, said housing having a bottom portion inclined upwardly from the bottom of said recess and then toward the infeed end of said housing, a sediment discharge conveyor in said recess and extending the length thereof in position to receive sediment from said sediment conveyor and from said inclined bottom portion, means driving said sediment discharge conveyor toward one side of said housing, and means at the end of said last named conveyor at said one side for removing sediment.

10. A deep fat fryer as defined in claim 9, wherein said sediment discharge conveyor is a helical screw.

11. A deep fat fryer as defined in claim 1, including an endless infeed conveyor mounted in said housing, said infeed conveyor having an upper run having a product portion receiving end near one end of said housing and having a product portion discharging end adjacent said main conveyor sufficiently close so that said infeed conveyor deposits product portions on said main conveyor, means for driving said upper run of said infeed conveyor toward said main conveyor, and support means for varying said product portion receiving end of said infeed conveyor from a position where said receiving end is near the top level of a bath of hot fat in said housing to a position approximately level with said main conveyor to control the cooking of a first crust on a batter-coated product portion before said portion lands on said infeed conveyor.

12. A deep fat fryer as defined in claim 11, wherein said infeed conveyor is mounted in said housing by providing an infeed conveyor drive shaft rotatably supported in said housing, said infeed conveyor having side rails oscillatably mounted on said shaft, and said depth varying means comprises support means for holding said last named side rails in selected positions about said shaft.

13. A deep fat fryer as defined in claim 1, including a hood covering said housing from end to end, said lifting means having connection with said hood for lifting said hood to a position spaced above said submerger conveyor when the latter is in said inoperative position, a steam vent for carrying away vapors from said housing when said fryer is in use, said vent having a hood outlet portion secured to said hood and extending laterally beyond said hood to a connection zone when said hood is in operative position, said vent having a fixed stack portion extending to said connection zone in registration with said hood outlet portion, and a quick connectable coupling for connecting said two vent portions at said connection zone.

14. A deep fat fryer as defined in claim 1, including an endless infeed conveyor mounted in said housing, said infeed conveyor having an upper run having a product portion receiving end near one end of said housing and having a product portion discharging end adjacent said main conveyor sufficiently close so that said infeed conveyor deposits product portions on said main conveyor, a pair of side rails for said main conveyor, said main conveyor and said infeed conveyor having drive shafts at their adjacent ends, said drive shafts rotatably mounted in said main conveyor said rails, a drive motor mounted on one of said main conveyor side rails, a driving connection from said motor to said infeed drive shaft, and a driving connection between said drive shafts.

15. A deep fat fryer as defined in claim 14, wherein said submerger conveyor has a drive shaft near said infeed end of said housing, and means drivingly connecting said last named shaft with said motor only when said main conveyor and said submerger conveyor are in operative position.

16. A deep fat fryer as defined in claim 14, wherein said last named means includes a drive shaft energized directly by said motor, a first gear rotatable with said motor drive shaft, a second gear on said submerger conveyor and drivingly connected to said submerger conveyor drive shaft, and said first and second gear s placing in drivingly meshed relationship only when said main conveyor and said submerger conveyor are in operative position in said housing.

17. A deep fat fryer as defined in claim 1, including a row of parallel spaced heating pipes in a first series at a single horizontal level extending crosswise of said housing below the normal level of hot fat contained therein, said first series extending through approximately the half of said housing toward the discharge end thereof, and two rows of parallel spaced heating pipes in a second series at two horizontal levels extending crosswise of said housing below the normal level of hot fat contained therein, said last two rows being staggered and extending through approximately the half of said housing toward the infeed end thereof.

18. In a deep fat fryer, an elongated housing adapted to hold a bath of hot fat up to a predetermined level and having means foheating said fat, an endless main conveyor mounted on said housing and adapted in operative position to carry food product portions on the upper run thereof from a product receiving end thereof to a discharge end thereof including a submerging of said portions in said hot fat, an endless infeed conveyor mounted in said housing below said predetermined level, said infeed conveyor having an upper run having a product protion receiving end near one end of said housing and having a product portion discharging end adjacent said main conveyor sufficiently close so that said infeed conveyor deposits porduct portions on said main conveyor, means for driving said upper run of said infeed conveyor toward said main conveyr, support means for varying said product portion receiving end of said infeed conveyor from a position where said receiving end is near the top level of a bath of hot fat in said housing to a position approximately level with said main conveyor to control the cooking of a first crust on a batter-coated product portion before said portion lands on said infeed conveyor, a submerger conveyor having outside side rails extending above said infeed conveyor, and food product portion guides consisting of guide strips secured to the inner faces of said submerger conveyor outside guide rails, said guide strips overhanging the longitudinal side edges of said infeed conveyor to prevent feed product portions sticking there.

19. In a deep fat fryer, an elongated housing adapted to hold a bath of hot fat up to a predetermined level and having means for heating said fat, an endless main conveyor mounted on said housing and adapted in operative position to carry food product portions on the upper run thereof from a product receiving end thereof to a discharge end thereof including a submerging of said portions in said hot fat, an endless infeed conveyor mounted in said housing below said predetermined level, said infeed conveyor having an upper run having a product portion receiving end near one end of said housing and having a product portion discharging end adjacent said main conveyor sufficiently close so that said infeed conveyor deposits product portions on said main conveyor, means for driving said upper run of said infeed conveyor toward said main conveyor, support means for varying said product portion receiving end of said infeed conveyor from a position where said receiving end is near the top level of a bath of hot fat in said housing to a position approximately level with said main conveyor to control the cooking of a first crust on a batter-coated product portion before said portion lands on said infeed conveyor, said housing having a bottom portion positioned closely below said infeed conveyor in its lowermost adjusted position, whereby to minimize the volume of hot fat contained in said housing.

20. In a deep fat fryer, an elongated housing adapted to hold a bath of hot fat and having means for heating said fat, an endless main conveyor mounted on said housing and adapted in operative position to carry food product portions on the upper run thereof from a product receiving end thereof to a discharge end thereof including a submerging of said portions in said hot fat, an endless infeed conveyor mounted in said housing below said predetermined level, said infeed conveyor having an upper run having a product portion receiving end near one end of said housing and having a product portion discharging end adjacent said main conveyor sufficiently close so that said infeed conveyor deposits product portions on said main conveyor, means for driving said upper run of said infeed conveyor toward said main conveyor, support means for varying said product portion receiving end of said infeed conveyor from a position where said receiving end is near the top level of a bath of hot fat in said housing to a position approximately level with said main conveyor to control the cooking of a first crust on a batter-coated product portion before said portion lands on said infeed conveyor, said infeeconveyor being mounted in said housing by providing an infeed conveyor drive shaft rotatably supported in said housing, said infeed conveyor drive shaft rotatably supported in said housing, said infeed conveyor having side rails oscillatably mounted on said shaft, and said depth varying means comprising support means for holding said last named side rails in selected positions about said shaft.

* * * * *